United States Patent
Pfister

(10) Patent No.: US 9,180,409 B2
(45) Date of Patent: Nov. 10, 2015

(54) METHOD FOR MONITORING THE POLLUTANT COVERSION CAPACITY IN AN EXHAUST GAS AFTER-TREATMENT SYSTEM

(75) Inventor: Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 492 days.

(21) Appl. No.: 13/232,047

(22) Filed: Sep. 14, 2011

(65) Prior Publication Data

US 2012/0060476 A1    Mar. 15, 2012

(30) Foreign Application Priority Data

Sep. 14, 2010  (DE) .......... 10 2010 040 678

(51) Int. Cl.
| | |
|---|---|
| *F01N 3/00* | (2006.01) |
| *B01D 53/94* | (2006.01) |
| *F01N 3/035* | (2006.01) |
| *F01N 3/10* | (2006.01) |
| *F01N 3/20* | (2006.01) |
| *F01N 11/00* | (2006.01) |
| *F02D 41/00* | (2006.01) |
| *F02D 41/40* | (2006.01) |
| *F02D 41/02* | (2006.01) |

(52) U.S. Cl.
CPC ............ *B01D 53/9495* (2013.01); *F01N 3/035* (2013.01); *F01N 3/103* (2013.01); *F01N 3/2066* (2013.01); *F01N 11/00* (2013.01); *B01D 53/944* (2013.01); *B01D 53/9418* (2013.01); *B01D 53/9477* (2013.01); *B01D 2251/2067* (2013.01); *F01N 2550/02* (2013.01); *F01N 2560/026* (2013.01); *F01N 2560/06* (2013.01); *F01N 2560/14* (2013.01); *F01N 2610/03* (2013.01); *F02D 41/0055* (2013.01); *F02D 41/405* (2013.01); *F02D 2041/0265* (2013.01); *Y02T 10/24* (2013.01); *Y02T 10/47* (2013.01)

(58) Field of Classification Search
CPC ..... B01D 53/9495; F01N 3/035; F01N 3/103; F01N 3/2066; F01N 11/00
USPC .......................................... 60/286
See application file for complete search history.

(56) References Cited

U.S. PATENT DOCUMENTS

| | | | |
|---|---|---|---|
| 6,367,320 B1 * | 4/2002 | Kueper et al. ............ | 73/114.71 |
| 2003/0182933 A1 * | 10/2003 | Adelman et al. ............. | 60/285 |
| 2009/0158710 A1 * | 6/2009 | Suzuki ........................ | 60/285 |
| 2009/0277159 A1 * | 11/2009 | Driscoll et al. ............... | 60/286 |
| 2010/0126143 A1 * | 5/2010 | Cho ............................. | 60/286 |

(Continued)

FOREIGN PATENT DOCUMENTS

| | | |
|---|---|---|
| DE | 102007003547 A1 | 4/2008 |
| DE | 102008049098 | 6/2009 |

(Continued)

*Primary Examiner* — Jason Shanske
(74) *Attorney, Agent, or Firm* — Michael Best & Friedrich LLP

(57) ABSTRACT

A method for monitoring a pollutant conversion capacity of a catalytically coated, oxidizing exhaust gas after-treatment component in an exhaust gas system of an internal combustion engine, wherein a capacity of the catalytic coating of the exhaust gas after-treatment component for oxidizing NO to $NO_2$ is ascertained from the degree of efficiency of a downstream SCR catalytic converter, characterized in that operating conditions for said exhaust gas after-treatment component are set such that the effects on the SCR catalytic converter are maximized.

16 Claims, 2 Drawing Sheets

(56) References Cited

U.S. PATENT DOCUMENTS

| | | | |
|---|---|---|---|
| 2010/0139246 A1* | 6/2010 | Andersson et al. | 60/276 |
| 2010/0139249 A1* | 6/2010 | Alm et al. | 60/285 |
| 2010/0139250 A1* | 6/2010 | Andersson et al. | 60/285 |
| 2010/0154392 A1* | 6/2010 | Robel | 60/297 |
| 2010/0199634 A1* | 8/2010 | Heaton | 60/274 |
| 2010/0205940 A1* | 8/2010 | Toshioka et al. | 60/276 |
| 2011/0146239 A1 | 6/2011 | Handler et al. | |
| 2011/0167801 A1* | 7/2011 | Massner | 60/274 |
| 2012/0222404 A1* | 9/2012 | Charial et al. | 60/274 |

FOREIGN PATENT DOCUMENTS

| | | |
|---|---|---|
| EP | 1055449 | 11/2000 |
| FR | 2807473 | 10/2001 |
| FR | 2952673 | 5/2011 |

* cited by examiner

METHOD FOR MONITORING THE POLLUTANT COVERSION CAPACITY IN AN EXHAUST GAS AFTER-TREATMENT SYSTEM

BACKGROUND OF THE INVENTION

The present invention relates to a method for monitoring a pollutant conversion capacity of a catalytically coated, oxidizing exhaust gas after-treatment component in an exhaust gas system of an internal combustion engine as well as to an open- and closed-loop control device, a computer program and a computer program product according to the preamble of the respective coordinate claims. This type of monitoring is, for example, typically used with three-way catalytic converters.

Stricter laws in the area of diagnosis of emission related components by a vehicle's onboard diagnostics (OBD) require the monitoring of all components of the exhaust gas after-treatment systems for adherence to certain OBD limit values, which are for the most part stated as a multiple of the emission limit values. In order to achieve the exhaust gas limit values required by the government, complex exhaust gas after-treatment systems are employed.

SCR catalytic converters (selective catalytic reduction) are used among other things for the conversion of nitrogen oxides. A specific ratio of NO to $NO_2$ in the exhaust gas is necessary for an optimal operation of the SCR catalytic converter. The $NO_2$ proportion of the total $NO_x$ is frequently designated as the feed gas composition.

The $NO_2$ proportion is as a rule considerably too low in the untreated emissions of the internal combustion engine. In order to provide a suitable $NO_2$ concentration, an oxidation catalytic converter (DOC) is disposed in the exhaust gas after-treatment system upstream of the SCR catalytic converter. As an alternative, it is also possible for a particle filter (DPF), which is correspondingly catalytically coated, to be provided in order to oxidize NO to $NO_2$. An increased $NO_2$ concentration in the exhaust gas also promotes the regeneration of the particle filter by oxygen from $NO_2$ molecules being consumed for the oxidation of the carbon of the embedded soot particles. A lower flow resistance and a longer loading phase are achieved by reducing the particle loading of the particle filter. Both have a positive effect on emissions.

Because the operability of the exhaust gas after-treatment components is important for the adherence to emission limit values, lawmakers have stipulated that the operation of said components is to be monitored over the service life of the motor vehicles. For example, the monitoring of the coating of the oxidation catalytic converter and the particle filter is required.

There is currently not a method known, which monitors the catalytically coated exhaust gas components for their capacity to convert NO to $NO_2$.

SUMMARY OF THE INVENTION

The problem underlying the invention is solved by a method according to the invention as well as by an open-loop- and/or closed loop control device, a computer program and a storage medium according to the coordinate claims. Important features for the invention are to be found in the following description and in the drawings.

The method according to the invention provides that operating conditions, which permit a monitoring of the feed gas generation for the SCR catalytic converter, are selectively set for the oxidation catalytic converter or the particle filter. A defined ratio of NO to $NO_2$ in the exhaust gas is necessary for an optimal operation of the SCR catalytic converter. The $NO_2$ proportion is as a rule considerably too small in the untreated emissions of the internal combustion engine. In order to provide the SCR catalytic converter with a feed gas having a suitable $NO_2$ concentration, an oxidation catalytic converter (DOC) is disposed upstream of said SCR catalytic converter in the exhaust gas after-treatment system. As an alternative, it is also possible for provision to be made for a correspondingly catalytically coated particle filter (DPF) in order to oxidize NO to $NO_2$. The feed gas composition has, however, an influence on the conversion of the SCR catalytic converter only under certain conditions, e.g. in the lower temperature range. Typical values for the lower temperature range can lie between 180 EC and 250 EC. These operating conditions would never or only seldom be attained during a normal operation or in a test operation of the internal combustion engine. The idea underlying the method is therefore that a change in the feed gas composition leads to a change in the conversion rate under certain circumstances and is hence detected by the nitrogen oxide probe disposed downstream of the SCR catalytic converter.

The invention furthermore proposes that a selective setting of the operating conditions comprises the operating temperature of the exhaust gas after-treatment components. That means that the operating temperature of an oxidation catalytic converter or a particle filter is set by usual measures, as, e.g., changing the air and/or fuel supply, such that the difference in the NO conversion between an intact coating and a defective coating is maximally pronounced and thereby also has a maximal effect on the efficiency of the SCR catalytic converter.

Different options exist for accomplishing this end. For example, more air can be supplied. As a result of this, the temperature drops. The temperature rises by displacing the injection angle in the direction of top dead center, i.e. in the "late" direction.

The efficiency of the SCR catalytic converter is then ascertained in a simple manner by evaluating the signals of the nitrogen oxide sensor disposed downstream of said SCR catalytic converter. The calculation and evaluation of the SCR efficiency with the aid of NOx sensors is described, for example, in the German patent application publication DE 10 2007 003 547 A1. It is also possible to use other evaluation algorithms. Thus, by balancing the NOx mass flow upstream and downstream of the SCR catalytic converter during dynamic NOx peaks, an assertion can be made as to how well said SCR catalytic converter can convert these NOx peaks. This conversion capacity is in turn dependent on the feed gas composition and can therefore be used as an indicator for a $NO_2$ proportion which is too small.

It is supplementally proposed that a selective setting of the operating conditions can be performed by shutting off the exhaust gas recirculation. By shutting off the exhaust gas recirculation, the nitrogen oxide concentration is raised upstream of the oxidation catalytic converter. This leads on the one hand to a reinforcement of the measuring effect because the efficiency of the SCR catalytic converter also changes more dramatically with the changed feed gas composition resulting from shutting of the exhaust gas recirculation. Moreover, the accuracy of the nitrogen oxide measurement is improved because the measuring accuracy of the nitrogen oxide sensors improves with an increasing nitrogen oxide concentration.

The method according to the invention works even better if hydrocarbons are introduced into an exhaust gas stream upstream of the exhaust gas after-treatment component. The introduction of the hydrocarbons takes place either by means of a late after injection or by means of a separate metering device in the exhaust gas duct upstream of the oxidation catalytic converter. The presence of hydrocarbons impedes the conversion of $NO_x$ to $NO_2$, respectively a reduction in the $NO_2$ can also occur as a result of the hydrocarbons. If a defective oxidation catalytic converter or particle filter now generates no or less $NO_2$, only a slight reduction in the $NO_2$ concentration results from the introduction of hydrocarbons and therefore has no or only a slight effect on the efficiency of the SCR catalytic converter. The operability of the coating of the oxidation catalytic converter (DOC) or the particle filter (DPF) can thereby be suggested.

It is particularly useful if the selective setting of the operating conditions takes place during normal operation of the internal combustion engine. In order to achieve a sharper distinction between defective and intact exhaust gas after-treatment components, plausibility checks, in particular, are carried out only under defined operating conditions. In the area of exhaust gas after-treatment, checks are thereby frequently limited to certain value ranges for one or a plurality of the following modeled or measured variables, for example: exhaust gas mass flow, exhaust gas volume flow, exhaust gas temperature at any desired location, operating point specified by engine rotational speed and injected fuel quantity, vehicle speed, ambient pressure, ambient temperature, signals from nitrogen oxide probes, particle mass probes, hydrocarbon probes, carbon monoxide probes and oxygen probes, exhaust gas recirculation rate, engine operating mode, motor status, engine run time, engine service life, etc. In addition, checks are frequently carried out for the same reason under stationary or quasi stationary conditions, which are determined on the basis of one or a plurality of the aforementioned variables. Operating conditions, in which the feed gas generation would have an effect on the conversion of the SCR catalytic converter and hence would permit a monitoring of the exhaust gas after-treatment components, are never or only seldom achieved during a normal operation of the internal combustion engine or during the test cycles listed above. A selective setting of the operating conditions during a normal operation thus facilitates a frequent monitoring of exhaust gas after-treatment components and thereby ensures the operability of the coating of the oxidation catalytic converter or the particle filter.

BRIEF DESCRIPTION OF THE DRAWINGS

Further advantages ensue from the following description and the accompanying figures and the explanation thereof.

It goes without saying that the previously mentioned features and those still to be subsequently explained cannot only be used in the combination specified in each case but also in other combinations or alone without departing from the scope of the present invention.

The following are shown, in each case in schematic form.

DETAILED DESCRIPTION

Figure 1:
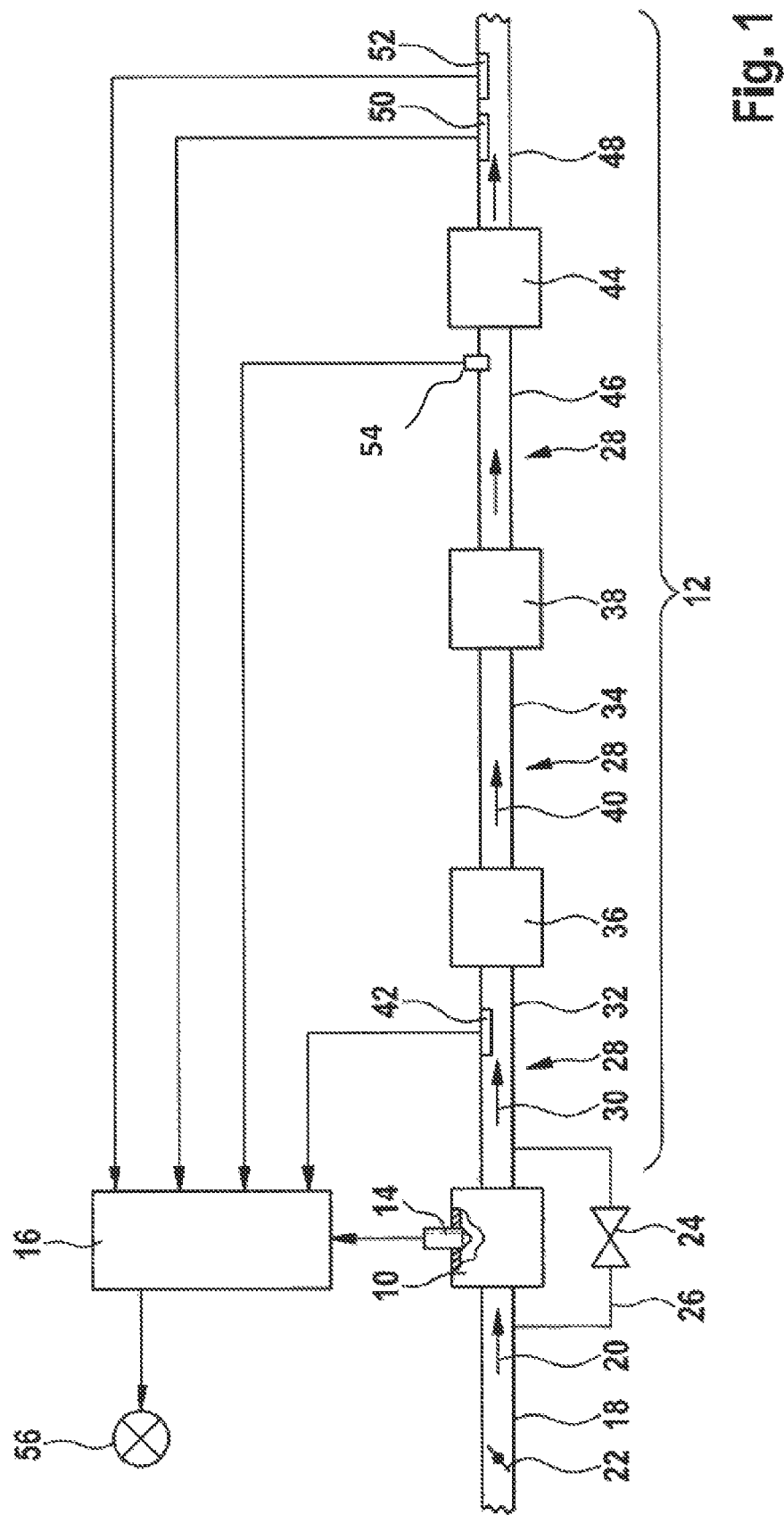
FIG. 1 the environment of the invention
FIG. 2 a flow diagram of the method

FIG. 1 shows an internal combustion engine 10 comprising an exhaust gas system 12 in a motor vehicle. The internal combustion engine 10 has injection valves 14 for fuel (in FIG. 1 only one injection valve 14 is depicted), which are connected to an open-loop and/or closed-loop control device, which is designed as a control unit 16. Air (arrow 20) is drawn into the combustion chambers (not depicted) of the internal combustion engine 10 via an intake manifold 18. The intake manifold 18 can alternatively or supplementally comprise sensors for detecting various state variables of the air 20, as, for example, a temperature and/or a pressure and/or a mass flow (not depicted). In addition, a throttle device 22 serving as an air quantity actuator can be provided in said intake manifold 18 for manipulating the air mass flow. An exhaust gas recirculation valve 24, disposed in an exhaust gas recirculation line 26, a boost pressure valve or an actuator for adjusting the geometry of an exhaust gas turbo charger serving as an air quantity actuator can alternatively or supplementally be used. Furthermore, a compressor of the air system for compressing the air 20 supplied to the internal combustion engine 10 can be disposed in said intake manifold 18, wherein the compressor can in turn form a part of an exhaust gas turbo charger.

The exhaust gas system 12 has an exhaust gas pipe 28, which receives the exhaust gases 30 of the internal combustion engine 10. A catalytically coated, oxidizing exhaust gas after-treatment component, for example, an oxidation catalytic converter, is disposed between a first section 32 and a second section 34 of the exhaust gas pipe 28. The oxidizing exhaust gas after-treatment component can also, for example, be a caltalytically coated particle filter, a three-way catalytic converter, a catalytically coated $NO_x$ storage catalytic converter or a composite construction of a plurality of these four components.

The outlet of the oxidation catalytic converter 36 is connected to an inlet of a particle filter 38 via the second section 34 of the exhaust gas pipe 28. The exhaust gas flowing out of the oxidation filter 36 is denoted with the reference numeral 40. A temperature sensor 42 is disposed in the direction of flow upstream of said oxidation catalytic converter 36. The signal of said temperature sensor can be queried and processed by the control unit 16. In addition, the exhaust gas system 12 comprises an SCR catalytic converter 44. The SCR catalytic converter 44 facilitates a selective catalytic reduction, which reduces nitrogen oxides in the exhaust gas in the presence of oxygen. Said SCR catalytic converter 44 is connected on the inlet side to an outlet of the particle filter 38 via a third section 46 of the exhaust gas pipe 28. An outlet of said SCR catalytic converter 44 opens out into a fourth section 48 of said exhaust gas pipe 28. nitrogen oxide sensor 50 and a second temperature sensor 52 are disposed in this fourth section 48. The signals of both sensors are queried and processed by said control unit 16.

It should be noted that the sensors shown here represent only a certain exemplary selection and further sensors can be disposed in the region of the exhaust gas pipe 28 during actual operation. There are also applications in which the SCR catalytic converter 44 is disposed upstream of the particle filter 38 (not depicted). A metering device 54, which can be controlled by the control unit 16, for injecting an aqueous urea solution from a separate tank (not depicted) projects into the third section 46 of the exhaust gas pipe 28. An actuator of the metering device 54 is connected to an outlet of the control unit 16. A warning signal device 56, for example, an error light, is furthermore attached to said control unit 16 in order to indicate the possible malfunction of a component of the exhaust gas after-treatment system 12, which has been diagnosed by said control unit 16.

The exhaust gas 30 discharged by the internal combustion engine 10 has a very high NO content (approximately 90%). The SCR catalytic converter 44 disposed in the direction of flow at the end of the exhaust gas pipe 28 works most effectively if the total quantity of nitrogen oxides in the exhaust gas at least approximately consists of 50% NO and 50% $NO_2$. The oxidation catalytic converter 36 disposed in the exhaust gas pipe 28 and a coating (not depicted) of the particle filter 38 therefore have the task of oxidizing NO to $NO_2$, so that the 50:50 ratio of the NO proportion to the $NO_2$ proportion of the nitrogen oxide concentration upstream of the SCR catalytic converter 44 is achieved.

The efficiency of the SCR catalytic converter 44 can therefore be used to monitor the catalytic coating of an oxidation catalytic converter 36 or a particle filter 38. Particularly by usual measures, such as changes in the air and/or fuel quantity, the temperature in the oxidation catalytic converter 36 or in the particle filter 38 can be set such that the difference in the $NO_2$ formation between a defective and an intact catalytic coating of the oxidation catalytic converter 36 or the particle filter 38 is maximized and in so doing also has a maximum effect on the efficiency of the SCR catalytic converter.

The control unit 16 is equipped, in particular programmed, for the purpose of carrying out the monitoring method according to the invention. In a preferred embodiment, said control unit 16 is set up by loading a computer program having the features of the independent computer program claim from a computer program product. Each file or collection of files, which contains the computer program in stored form, as well as each carrier, which contains such a file or collection of files, is understood by the term computer program product.

Figure 2:
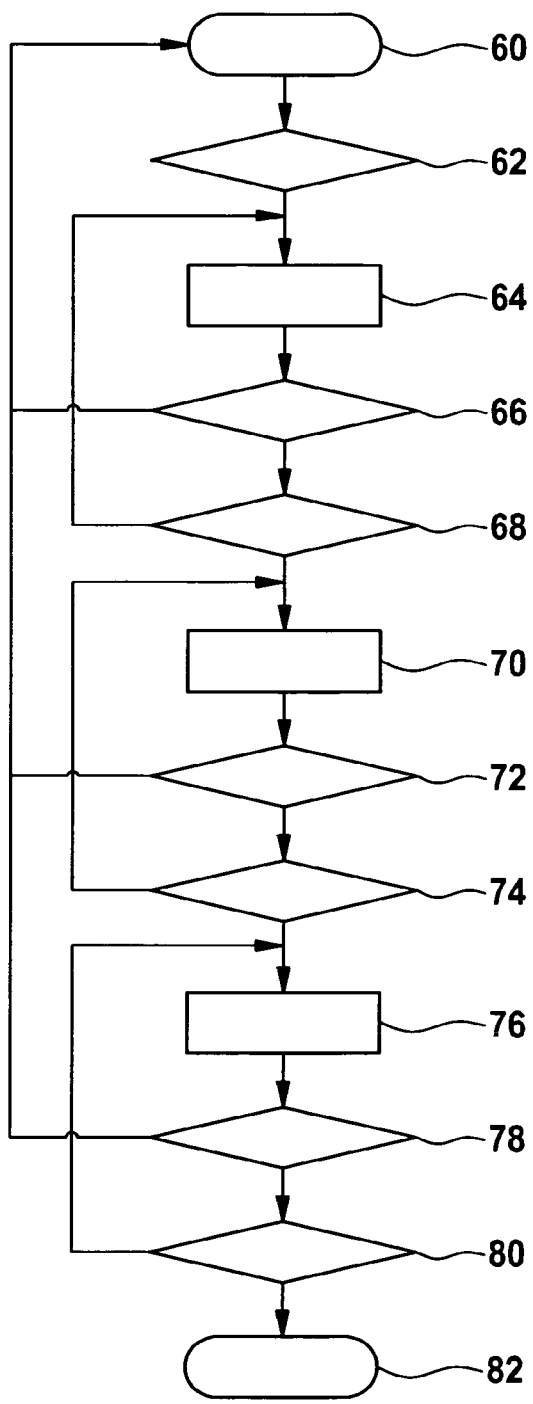

FIG. 2 shows the sequence of events of the method in a flow diagram. The method starts in step 60. Prior to the measures being activated in step 64, which are required to set the temperature in the oxidation catalytic converter 36, a check is made in a query 62 as to whether the starting conditions have been met. The measures include, for example, a corresponding change in the air and/or fuel supply. As long as the termination conditions are not met in step 66, the method proceeds with a query 68. A check is made in said query 68 as to whether the temperature and additional conditions for carrying out the method have been achieved. If this is the case, the exhaust gas recirculation is shut off and a waiting time for stabilizing the system is started. As long as the termination conditions in step 72 have not been met, the method proceeds. If the release conditions, which are "exhaust gas recirculation shut off" and "waiting time for system stabilization elapsed", are met in a query 74, an SCR efficiency is ascertained in step 76. The efficiency can thereby be ascertained in a known manner via an efficiency calculation when quasi stationary nitrogen oxide concentrations are present.

An evaluation of the nitrogen oxide peaks, as they are produced by the shutting off and turning on of the exhaust gas recirculation previously described or as said peaks occur as a result of changes in load, can alternatively be used for ascertaining the efficiency of the SCR catalytic converter. As long as the termination conditions in step 78 are not met, the method proceeds further. If the conditions for an evaluation are met corresponding to a query 80, the method ends in step 82 with the evaluation of the data for the efficiency of the SCR catalytic converter. According to the invention, said data permit conclusions to be drawn about the operability of the catalytic coating of the oxidation catalytic converter (DOP) 36 or of the particle filter (DPF) 38.

Some starting or termination conditions can be used in every step, while other conditions are specifically defined for each of the steps. Typical starting or termination conditions are, for example, the engine operating point (=f (rotational speed n and injected fuel quantity q, mass flow of the combustion air, exhaust gas temperature).

A termination condition, which can be used in each of the steps, then exists if the desired temperature range of the exhaust gas temperature can not be set over an extended period of time.

Very many parameters can be queried and checked in the last step 82.

The invention claimed is:

1. A method for monitoring a pollutant conversion capacity of a catalytically coated, oxidizing exhaust gas after-treatment component (36, 38) located upstream of a downstream SCR catalytic converter (44) in an exhaust gas system (12) of an internal combustion engine (10), the method comprising:
    drawing conclusions, by an electronic control unit (16), about an operability the catalytic coating of the exhaust gas after-treatment component (36, 38) for oxidizing NO to $NO_2$ based on the efficiency of the downstream SCR catalytic converter (44);
    setting operating conditions of the exhaust gas after-treatment component (36, 38) based on the conclusions about the operability of the catalytic coating of the exhaust gas after-treatment component (36, 38) to maximize the efficiency of the SCR catalytic converter; and
    shutting off an exhaust gas recirculation by the electronic control unit (16) based on the conclusions about the operability of the catalytic coating of the exhaust gas after-treatment component.

2. The method according to claim 1, characterized in that the setting of operating conditions of the exhaust gas after-treatment component (36, 38) includes setting an operating temperature of the exhaust gas after-treatment component (36, 38).

3. The method according to claim 1, characterized in that hydrocarbons are introduced into the exhaust gas stream (30) upstream of the exhaust gas after-treatment component (36, 38).

4. The method according to claim 2, characterized in that the setting of the operating conditions of the exhaust gas after-treatment component (36, 38) takes place during operation of the internal combustion engine (10).

5. The method according to claim 1, the method further comprising: balancing a NOx mass flow upstream and downstream of the SCR catalytic converter (44) during NOx peaks when an $NO_2$ proportion is less than 50 percent.

6. An electronic control unit (16), the electronic control unit (16) connected to an exhaust gas recirculation valve and a NOx sensor in an exhaust gas after-treatment component, the electronic control unit (16) monitoring a pollutant conversion operability of a catalytically coated, oxidizing exhaust gas after-treatment component (36, 38) located upstream of a downstream SCR catalytic converter (44) in an exhaust gas system (12) of an internal combustion engine, characterized in that the electronic control unit (16) is configured to
    draw conclusions about an operability of the catalytic coating of the exhaust gas after-treatment component (36, 38) for oxidizing NO to $NO_2$ from a degree of efficiency of the SCR catalytic converter (44) located downstream of said component;
    set operating conditions for the exhaust gas after-treatment component (36, 38) based on the conclusions about the operability of the catalytic coating of the exhaust gas after-treatment component (36, 38); and
    shut off the exhaust gas recirculation valve when indicated by the conclusions about the operability of the catalytic coating of the exhaust gas after-treatment component (36, 38).

7. The electronic control unit (16) according to claim 6, wherein the electronic control unit (16) is an open-loop control device.

8. The electronic control unit (16) according to claim 6, wherein the electronic control unit (16) is a closed-loop control device.

9. The electronic control unit (16) according to claim 6, wherein the electronic control unit (16) is an open-loop control device and a closed-loop control device.

10. The electronic control unit (16) according to claim 6, characterized in that said electronic control unit (16) is equipped to set operating conditions for the exhaust gas after-treatment component (36, 38) such that the effects on the SCR catalytic converter (44) are maximal.

11. The electronic control unit (16) according to claim 6, characterized in that the selective setting of operating conditions for the exhaust gas after-treatment component (36, 38) includes setting an operating temperature of the exhaust gas after-treatment component (36, 38).

12. The electronic control unit (16) according to claim 6, characterized in that the electronic control unit (16) causes hydrocarbons to be introduced into the exhaust gas stream (30) upstream of the exhaust gas after-treatment component (36, 38).

13. The electronic control unit (16) according to claim 11, characterized in that the selective setting of the operating conditions for the exhaust gas after-treatment component (36, 38) takes place during operation of the internal combustion engine (10).

14. The electronic control unit (16) according to claim 6, wherein the electronic control unit (16) is further configured to balance a NOx mass flow upstream and downstream of the SCR catalytic converter (44) during NOx peaks when an $NO_2$ proportion which is less than 50 percent.

15. A non-transitory computer readable medium including a computer program for execution by an electronic control unit (16) connected to an exhaust gas recirculation value and a NOx sensor in an exhaust gas after-treatment component, characterized in that said electronic control unit (16) executes the computer program to perform monitoring of a pollutant conversion operability of a catalytically coated, oxidizing exhaust gas after-treatment component (36, 38) in an exhaust gas system (12) of an internal combustion engine (10), characterized in that the computer program configures the electronic control unit (16) to draw conclusions about the operability of the catalytic coating of the exhaust gas after-treatment component (36, 38) for oxidizing NO to NO2 is ascertained from the efficiency of a downstream SCR catalytic converter (44);

selectively set operating conditions for the exhaust gas after-treatment component (36, 38) based on the conclusions about the operability of the catalytic coating of the exhaust gas after-treatment component (36, 38) to maximize the efficiency of the downstream SCR catalytic converter (44), and shut off an exhaust gas recirculation by the electronic control unit (16) when indicated by the conclusions about the operability of the exhaust gas after-treatment component (36, 38).

16. The non-transitory computer readable medium according to claim 15, wherein the computer program resides in the non-transitory computer readable medium in a machine-readable form.

* * * * *